US012808283B1

(12) United States Patent
Qi et al.

(10) Patent No.: US 12,808,283 B1
(45) Date of Patent: Nov. 24, 2026

(54) SILICA GEL AND METHOD OF USING THE SAME FOR CARBON DIOXIDE SEQUESTRATION IN A RESERVOIR

(71) Applicant: Saudi Arabian Oil Company, Dhahran (SA)

(72) Inventors: Ziyuan Qi, Beijing (CN); Tianping Huang, Beijing (CN); Lei Ding, Beijing (CN); Almohannad A. Alhashboul, Dhahran (SA); Abdulaziz S. Al-Qasim, Dhahran (SA); Dongqing Cao, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/212,946

(22) Filed: May 20, 2025

(51) Int. Cl.

| | |
|---|---|
| ***E21B 41/00*** | (2006.01) |
| ***C01B 33/14*** | (2006.01) |
| ***E21B 47/103*** | (2012.01) |
| ***E21B 47/107*** | (2012.01) |

(52) U.S. Cl.
CPC .......... *E21B 41/0064* (2013.01); *C01B 33/14* (2013.01); *E21B 47/103* (2020.05); *E21B 47/107* (2020.05)

(58) Field of Classification Search
CPC ............. E21B 41/00694; E21B 47/107; E21B 47/103; C01B 33/14
See application file for complete search history.

(56) References Cited

U.S. PATENT DOCUMENTS

| | | | | |
|---|---|---|---|---|
| 7,846,250 | B2 | 12/2010 | Barlet-Gouedard et al. | |
| 10,961,444 | B1 * | 3/2021 | Bestaoui-Spurr | C09K 8/524 |
| 2004/0031611 | A1 | 2/2004 | Huang et al. | |
| 2011/0091955 | A1 * | 4/2011 | Constantz | F23J 15/04 435/177 |
| 2020/0071601 | A1 | 3/2020 | Long et al. | |
| 2022/0065083 | A1 * | 3/2022 | Ayirala | E21B 43/20 |
| 2023/0258065 | A1 * | 8/2023 | Al-Qasim | E21B 43/16 166/249 |
| 2023/0313645 | A1 * | 10/2023 | Al-Qasim | E21B 41/0064 166/250.01 |

FOREIGN PATENT DOCUMENTS

WO WO-2023015350 A1 * 2/2023 .......... C01B 33/154

OTHER PUBLICATIONS

Hatami et al., "On the application of silica gel for mitigating CO2 leakage in CCS projects: Rheological properties and chemical stability," Journal of Petroleum Science and Engineering, 2021, 207:109155, 9 pages.

(Continued)

*Primary Examiner* — Silvana C Runyan
(74) *Attorney, Agent, or Firm* — Fish & Richardson P.C.

(57) ABSTRACT

Embodiments of the present disclosure provide a method. The method includes identifying a location of cap rock in a subterranean formation, wherein the cap rock is positioned above a reservoir in the subterranean formation. The method includes injecting an alkali metal silicate solution through a wellbore in the subterranean formation such that the alkali metal silicate solution distributes along an inner surface of the cap rock and contacting the alkali metal silicate solution with carbon dioxide to form a silica gel along the inner surface of the cap rock.

18 Claims, 3 Drawing Sheets

(56) References Cited

OTHER PUBLICATIONS

Katoueizadeh et al., “A comprehensive study on the gelation process of silica gels from sodium silicate,” Journal of Materials Research and Technology, Sep.-Oct. 2020, 9(5):10157-10165, 9 pages.
Matinfar et al., “A review of sodium silicate solutions: Structure, gelation, and syneresis,” Advances in Colloid and Interface Science, Dec 2023, 322:103036, 11 pages (Abstract Only).
Ngo et al., “Experimental Investigation of CO2-Induced Silica Gel as the Water Blocking Group Effect of Aquifer Ions,” ACS Omega, 2022, 27090-27101, 12 pages.

* cited by examiner

SILICA GEL AND METHOD OF USING THE SAME FOR CARBON DIOXIDE SEQUESTRATION IN A RESERVOIR

TECHNICAL FIELD

Embodiments of this disclosure generally relate to sequestration of carbon dioxide. More specifically, embodiments of the present disclosure relate to a silica gel and method of using the same for carbon dioxide sequestration in a reservoir.

BACKGROUND

Carbon capture and storage (CCS) is a critical technology in mitigating climate change by reducing atmospheric CO2 levels. CCS involves capturing CO2 from industrial sources, such as power plants, and storing it in geological formations like deep saline aquifers or depleted oil reservoirs. Despite its potential, CCS faces challenges, including the buoyancy of CO2, which can lead to plumes that compromise cap rock integrity, risking leakage and reducing storage efficiency.

SUMMARY

An embodiment of the present disclosure relates to a method. The method includes identifying a location of cap rock in a subterranean formation, wherein the cap rock is positioned above a reservoir in the subterranean formation. The method includes injecting an alkali metal silicate solution through a wellbore in the subterranean formation such that the alkali metal silicate solution distributes along an inner surface of the cap rock. The method includes contacting the alkali metal silicate solution with carbon dioxide to form a silica gel along the inner surface of the cap rock.

In some embodiments, a carbon dioxide sequestration system is provided. The carbon dioxide sequestration system includes a caprock positioned above a reservoir in a subterranean formation, a silica gel positioned along an inner surface of the caprock, and carbon dioxide sequestered within the reservoir. The silica gel forms a seal along the inner surface of the caprock to mitigate the carbon dioxide from leaking out of the reservoir through the caprock.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF THE DRAWINGS

In general, like reference numbers and designations in the various drawings indicate like elements.

DETAILED DESCRIPTION

Figure 1:
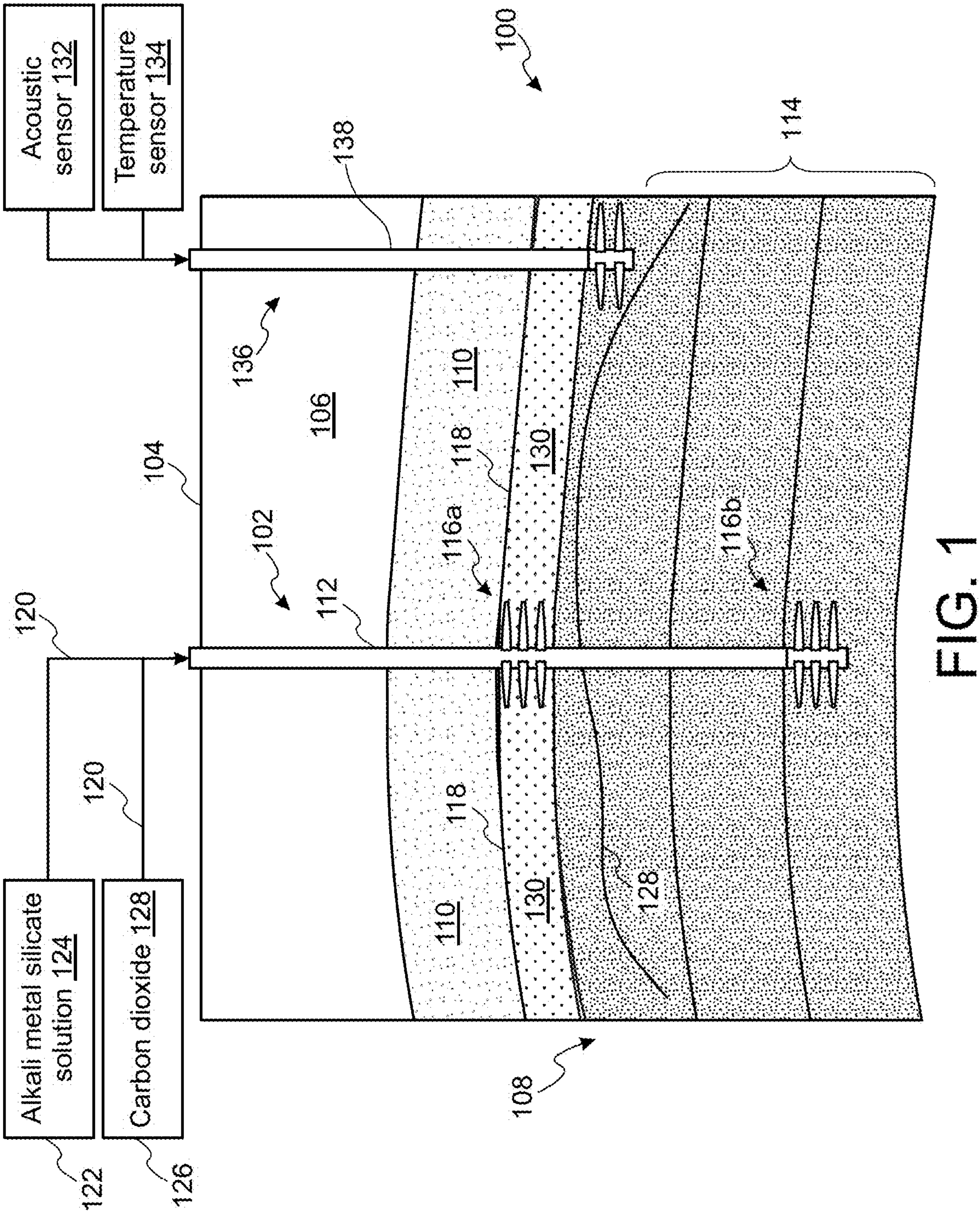
FIG. 1 is a schematic illustration of a carbon dioxide sequestration system according to embodiments of the present disclosure.

Embodiments of the present disclosure provide a silica gel, a carbon dioxide sequestration system, and a method of using the same for sequestration of carbon dioxide within a reservoir in a subterranean formation. In some embodiments, the reservoir is a deep saline aquifer or a depleted oil reservoir, which present viable options for carbon dioxide storage due to their advantageous geological formations and existing infrastructure conducive for carbon dioxide containment. Once sequestered within the reservoir, carbon dioxide is expected to remain sequestered from the atmosphere for an extended duration, thereby reducing the amount of carbon dioxide that may have been released to the atmosphere.

One technical challenge associated with sequestering carbon dioxide in reservoirs is that the relatively low density of liquid or supercritical carbon dioxide tends to create a plume of carbon dioxide at upper levels of the reservoir. In certain instances, the plume may affect the integrity of cap rock, which serves as a barrier that mitigates, or otherwise prevents, carbon dioxide from escaping the reservoir. If the plume sufficiently affects the integrity of the cap rock to create fissures or fractures, the carbon dioxide can leak out of the reservoir and may ultimately find its way back to the atmosphere.

Embodiments of the present disclosure provide a silica gel, a carbon dioxide sequestration system, and a method of using the same that provide practical applications and technical features to address the aforementioned technical challenges. Specifically, the silica gel provided herein may be used to form a seal along an inner surface of the cap rock within the reservoir. The seal formed by the silica gel is configured to mitigate, or otherwise prevent, carbon dioxide from leaking out of the reservoir through the cap rock. As will be described herein, the present disclosure provides a method of injecting an alkali metal silicate solution through a wellbore in the subterranean formation such that the alkali metal silicate solution distributes along an inner surface of the cap rock. The method includes contacting the alkali metal silicate solution with carbon dioxide to form a silica gel along the inner surface of the cap rock. The reaction between the alkali metal silicate, carbon dioxide and water yields the silica gel. In some embodiments, the silica gel is a rigid gel. The silica gel may act as a seal that mitigates, or otherwise effectively blocks, any potential leakage pathways within the cap rock. The provided silica gel, carbon dioxide sequestration system, and method of using the same may enhance the safety and reliability of carbon dioxide sequestration, improving the reservoir's ability to isolate carbon dioxide from the atmosphere and contributing to the broader objective of carbon footprint reduction. The adaptability of the embodiments provided herein allows for customization based on unique conditions of each sequestration site, making the embodiments provided herein a versatile tool in the fight against climate change.

Referring to FIG. 1, a carbon dioxide sequestration system 100 is shown according to an embodiment of the present disclosure. The carbon dioxide sequestration system 100 includes a wellbore 102 that is formed through a surface 104 of the Earth and into a subterranean formation 106. The subterranean formation 106 includes a reservoir 108. In some embodiments, the reservoir 108 is a deep saline aquifer or a depleted oil reservoir. In some embodiments, the reservoir 108 includes cap rock 110. The cap rock 110 may include any nonpermeable rock that may trap a fluid, such as oil, gas, or water within the subterranean formation 106, preventing the fluid from migrating to the surface. In some embodiments, the cap rock 110 comprises shale, anhydrite, gypsum, halite, calcite, minerals (e.g., quartz, albite, muscovite, etc.), or combinations thereof. In some embodiments, the cap rock 110 may have any suitable structure for trapping the fluid, which may include but is not limited to, an anticline trap, a fault trap, a salt dome trap, or a stratigraphic trap. In some embodiments, the reservoir 108 comprises a fluid 114. For example, if the reservoir 108 is a deep saline aquifer, the fluid 114 may comprise saline water, which may optionally be disposed in layers of porous rock. If the reservoir 108 is a depleted oil reservoir, the fluid 114 may be water, and optionally residual oil and gas.

In some embodiments, the wellbore 102 includes a wellbore wall 112 that has been drilled to penetrate through the subterranean formation 106, the cap rock 110, and into the reservoir 108. The wellbore wall 112 may be formed out of one or more casing strings disposed therein. The casing strings of the wellbore wall 112 may be a series of connected pipes that are lowered into the wellbore and cemented in place to form the wellbore 102. Production tubing may be disposed in the wellbore 102. The production tubing may be held in place within the wellbore 102 by one or more packers. For example, the packer(s) may be positioned between the production tubing and the wellbore wall 112 to hold the production tubing in place within the wellbore 102. The wellbore 102 may include a first set of perforations 116*a* that provide fluid communication between the reservoir 108 and production tubing in the wellbore 102. In some embodiments, the first set of perforations 116*a* are positioned proximate to an inner surface 118 of the cap rock 110. In some embodiments, the first set of perforations 116*a* are configured such that fluid injected through the wellbore and exiting the first set of perforations 116*a* is configured to distribute along the inner surface 118 of the cap rock 110. In some embodiments, the wellbore 102 has a set of perforations 116*b* that provide fluid communication between the reservoir 108 and production tubing in the wellbore 102. In some embodiments, the second set of perforations 116*b* are positioned deeper in the reservoir relative to the first set of perforations 116*a*.

In some embodiments, a production header line 120 is in fluid communication with the production tubing of the wellbore 102. In some embodiments, the production header line 120 places a first source 122 comprising an alkali metal silicate solution 124 in fluid communication with the production tubing of the wellbore 102. In some embodiments, the first source 122 is a vessel, such as a tank, configured to store the alkali metal silicate solution 124. A pump (not shown) may be configured to transport the alkali metal silicate solution 124 from the first source 122 to the production tubing of the wellbore 102. In some embodiments, the production header line 120 is in fluid communication with a second source 126 comprising carbon dioxide 128. The second source 126 may be a vessel, such as a tank, configured to store the carbon dioxide 128. In some embodiments, the carbon dioxide 128 is stored as supercritical carbon dioxide within the second source 126. A compressor or pump (not shown) may be configured to transport the carbon dioxide 128 from the second source 126 to the production tubing in the wellbore 102.

In some embodiments, the alkali metal silicate solution 124 comprises an alkali metal silicate. The alkali metal silicate may include an alkali metal. The alkali metal may include sodium, potassium, lithium, rubidium, cesium, or combinations thereof. In some embodiments, the alkali metal silicate is present in the alkali metal silicate solution 124 in an amount from 1 to 20 wt. %, based on a total weight of the alkali metal silicate solution 124. In some embodiments, the alkali metal silicate is present in an amount of at least 1 wt. % (e.g., at least 2 wt. %, at least 3 wt. %, at least 4 wt. %, or at least 5 wt. %) and/or to at most 20 wt. % (e.g., at most 15 wt. %, at most 10 wt. %, at most 9 wt. %, at most 8 wt. %, at most 7 wt. %, or at most 6 wt. %), based on a total weight of the alkali metal silicate solution 124.

In some embodiments, the alkali metal silicate solution 124 includes an alkali salt. The alkali salt may be used to adjust a pH of the alkali metal silicate solution 124, which may be helpful to obtain optimal conditions for gelation. In some embodiments, the alkali salt includes, but is not limited to, sodium hydroxide, sodium carbonate, or combinations thereof. In some embodiments, the alkali salt is present in the alkali metal silicate solution 124 in an amount from 0.5 to 12 wt. %, based on the total weight of the alkali metal silicate solution 124. In some embodiments, the alkali salt is present in an amount of at least 0.5 wt. % (e.g., at least 1 wt. %, at least 2 wt. %, at least 3 wt. %, at least 4 wt. %, or at least 5 wt. %) and/or to at most 12 wt. % (e.g., at most 11 wt. %, at most 10 wt. %, at most 9 wt. %, at most 8 wt. %, at most 7 wt. %, or at most 6 wt. %).

In some embodiments, the alkali metal silicate solution 124 comprises a gel enhancing additive, such as a polymeric additive, natural polymer additive, inorganic additive, surfactant, or combinations thereof. The gel enhancing additives may be incorporated into the alkali metal silicate solution 124 to improve the mechanical strength and/or longevity of the silica gel in the reservoir 108. For example, the polymeric agent may help to increase the flexibility and durability of the silica gel 130. In some embodiments, natural polymer additives may help contribute to the biocompatibility of the silica gel 130. In some embodiments, the inorganic additive may enhance the structural integrity and resistance to shear forces of the silica gel 130. In some embodiments, the surfactant may enhance surface properties of the silica gel 130, improving the interaction with carbon dioxide and brine.

In some embodiments, the polymeric additive includes, but is not limited to, polyacrylamide, polyacrylic acid, or combinations thereof. In some embodiments, the polymeric additive is present in an amount from 1 to 15 wt. %, based on a total weight of the alkali metal silicate solution 124. In some embodiments, the polymeric additive is present in an amount of at least 1 wt. % (e.g., at least 2 wt. %, at least 3 wt. %, at least 4 wt. %, or at least 5 wt. %) and/or to at most 15 wt. % (e.g., at most 14 wt. %, at most 13 wt. %, at most 12 wt. %, at most 11 wt. %, at most 10 wt. %, at most 9 wt. %, at most 8 wt. %, at most 7 wt. %, or at most 6 wt. %), based on the total weight of the alkali metal silicate solution 124.

In some embodiments, the natural polymer includes, but is not limited to, guar gum, cellulose, or combinations thereof. In some embodiments, the natural polymer additive is present in an amount from 0.5 to 10 wt. %, based on a total weight of the alkali metal silicate solution 124. In some embodiments, the natural polymer additive is present in an amount of at least 1 wt. % (e.g., at least 2 wt. %, at least 3 wt. %, at least 4 wt. %, or at least 5 wt. %) and/or to at most 10 wt. % (e.g., at most 9 wt. %, at most 8 wt. %, at most 7 wt. %, or at most 6 wt. %), based on the total weight of the alkali metal silicate solution 124.

In some embodiments, the inorganic additive includes clay, a fiber material, or combinations thereof. As used herein, a "fiber material" may refer to a material composed of an elongated structure that is configured to reinforce, strengthen, or provide other desirable properties to the alkali metal silicate solution. Suitable fiber materials may include, but are not limited to carbon fiber, glass fiber, natural fibers, synthetic fibers, ceramic fibers, nanofibers, or combinations thereof. Exemplary natural fibers may include, but are not limited to, cellulose fibers (e.g., from wood pulp or cotton linters), hemp fibers, flax fibers, sisal fibers, or combinations thereof. Exemplary synthetic fibers may include, but are not limited to, polyamide fibers (e.g., nylon), polyester fibers, polypropylene fibers, polycarbonate fibers, polylactic acid fibers, polyglycolic acid fibers, or combinations thereof. Exemplary ceramic fibers include, but are not limited to, alumina, silica-based fibers, or combinations thereof. Exemplary nanofibers include, but are not limited to, carbon nanotubes, nanocellulose fibers, or combinations thereof. The fiber materials may be used individually or in combination to achieve the desired properties of in the alkali metal silicate solution 124.

In some embodiments, the inorganic additive is present in an amount from 1 to 20 wt. %, based on the total weight of the alkali metal silicate solution 124. In some embodiments, the organic additive is present in an amount of at least 1 wt. % (e.g., at least 2 wt. %, at least 3 wt. %, at least 4 wt. %, or at least 5 wt. %) and/or to at most 20 wt. % (e.g., at most 15 wt. %, at most 10 wt. %, at most 9 wt. %, at most 8 wt. %, at most 7 wt. %, or at most 6 wt. %), based on a total weight of the alkali metal silicate solution 124. In some embodiments, the alkali metal silicate solution 124 includes a surfactant.

In some embodiments, the surfactant includes, but is not limited to, an anionic surfactant, a nonionic surfactant, a cationic surfactant, an amphoteric surfactant, or combinations thereof. Exemplary anionic surfactants include, but are not limited to, sodium lauryl sulfate (SLS), sodium laureth sulfate (SLES), sodium oleate, or combinations thereof. Exemplary nonionic surfactants include, but are not limited to, polysorbate 20 (Tween 20), polysorbate 80 (Tween 80), pluronic F-68, or combinations thereof. Exemplary cationic surfactants include, but are not limited to, quaternary ammonium compounds (e.g., cetyltrimethylammonium bromide), imidazoline-based surfactants, or combinations thereof. Exemplary amphoteric surfactants include, but are not limited to, cocamidopropyl betaine, sodium cocoamphoacetate, myristyl sulfobetaine, or combinations thereof. The surfactants may help to improve wetting, dispersion, and stability of the alkali metal silicate solution 124.

In some embodiments, the alkali metal silicate solution 124 includes the surfactant in an amount from 0.1 to 5 wt. %, based on the total weight of the alkali metal silicate solution 124. In some embodiments, the surfactant is present in an amount of at least 0.1 wt. % (e.g., at least 0.5 wt. %, at least 1 wt. %, at least 2 wt. %) and/or to at most 5 wt. % (e.g., at most 4 wt. %, or at most 3 wt. %), based on a total weight of the alkali metal silicate solution 124. In some embodiments, the alkali metal silicate solution 124 includes a solvent. In some embodiments, the solvent is water. The solvent may be present in the alkali metal silicate solution 124 in an amount from 15 to 99 wt. %, based on a total weight of the alkali metal silicate solution 124.

In some embodiments, the solvent is present in an amount of at least 15 wt. % (e.g., at least 20 wt. %, at least 30 wt. %, at least 40 wt. %, or at least 50 wt. %) and/or to at most 99 wt. % (e.g., at most 90 wt. %, at most 80 wt. %, at most 70 wt. %, or at most 60 8 wt. %, based on a total weight of the alkali metal silicate solution 124. As will be described in further detail below, the alkali metal silicate solution 124 may be injected through the wellbore 102 and the first perforations **116*a* such that the alkali metal silicate solution 124 is distributed along the inner surface 118 of the cap rock 110. The viscosity of the alkali metal silicate solution 124 and the pressure of the injection aids to keep the alkali metal silicate solution 124 close to the inner surface 118 with minimal diffusion into the reservoir 108. In some embodiments, the alkali metal silicate solution 124 has a density that is slightly higher than the density of the fluids 114 in the reservoir 108, aiding its placement under gravity once injected. The alkali metal silicate solution 124 may be contacted with carbon dioxide 128 to form a silica gel 130 along the inner surface 118 of the cap rock 110. For example, the chemical reaction for forming the silica gel 130** may proceed according to the following equation:

$$R_2SiO_3 + H_2O + CO_2 \longrightarrow H_2SiO_3 + R_2CO_3$$

where R is an alkali metal. In this reaction, the alkali metal silicate reacts with water and carbon dioxide to produce insoluble silicic acid, which precipitates out of solution to form the gel, and an alkali metal carbonate. If the additives are present in the alkali metal silicate solution 124, the silica gel may further include the additives (e.g., an alkali salt, a polymeric additive, a natural polymer, an inorganic additive, a surfactant, or combinations thereof). The reaction typically proceeds in a forward direction and is minimally, or not, reversible under normal conditions. In some embodiments, the silica gel 130 is insensitive to variations in brine salinity and temperature, which broadens its applicability across diverse environmental conditions. Once reacted, the silica gel 130 forms a seal along the inner surface 118 of the cap rock 110 that is configured to mitigate, or otherwise prevent, carbon dioxide from leaking out of the reservoir 108 through the cap rock 110.

In some embodiments, the silica gel 130 has a storage modulus (G') from 2000 to 4000 Pa. In some embodiments, the silica gel 130 has a storage modulus of at least 2000 Pa (e.g., at least 2250 Pa, at least 2500 Pa, at least 2750 Pa) and/or to at most 4000 Pa (e.g., at most 3750 Pa, at most 3500 Pa, at most 3250 Pa, or at most 3000 Pa). In some embodiments, the silica gel 130 has a loss modulus (G") from 150 Pa to 500 Pa. In some embodiments, the silica gel 130 has a loss modulus of at least 150 Pa (e.g., at least 175 Pa, at least 200 Pa, at least 225 Pa, at least 250 Pa, at least 275 Pa, or at least 300 Pa) and/or to at most 500 Pa (e.g., at most 475 Pa, at most 450 Pa, at most 425 Pa, at most 400 Pa, at most 375 Pa, or at most 350 Pa). The disparity between G' and G" may suggest that the gel exhibits greater elasticity than plasticity. This is beneficial for a sealing material as is it suggests that the silica gel 130 can withstand deformation with minimal or no change to a structure of the silica gel 130.

In some embodiments, the carbon dioxide sequestration system 100 includes real-time monitoring systems configured to assess the effectiveness of the seal formed by the silica gel 130 along the inner surface 118 of the cap rock 110. For example, the carbon dioxide sequestration system 100 may include one or more observation wellbore 136 configured to allow the real-time monitoring systems to collect data associated with the silica gel 130 and/or fluids 114 in the reservoir 108. The observation wellbore 136 may include a wellbore wall 138 that has been drilled to penetrate through the subterranean formation 106, the cap rock 110, and into the reservoir 108. The wellbore wall 138 may be formed out of one or more casing strings disposed therein. The casing strings of the wellbore wall 138 may be a series of connected pipes that are lowered into the wellbore and cemented in place to form the observation wellbore 136.

The wellbore wall 138 may include perforations 140 that allow an acoustic sensor 132 to detect a change in sound velocity that is indicative of the integrity of the silica gel 130 or a leak. For example, the acoustic sensor 132 may be configured to measure a change in the sound velocity of the silica gel 130 over time, which may be indicative of the silica gel 130 deteriorating. If it is determined that a section of the silica gel 130 is deteriorating, the alkali metal silicate solution 124 can be distributed over the deteriorating section and contacted with carbon dioxide to strength the deteriorating section by forming a silica gel 130 to mitigate future leaks.

In some embodiments, the acoustic sensor 132 may measure a change in sound velocity indicative of a leak. For example, if the integrity of the cap rock 110 and the silica gel 130 deteriorate over time, the carbon dioxide 128 sequestered may leak out the reservoir 108. The leak may cause a change in the sound velocity as measured by the acoustic sensor 132. For example, the flow of carbon dioxide exiting the reservoir may cause a change in the sound velocity. In another example, as the carbon dioxide 128 leaks from the reservoir 108 it may be displaced by water in the reservoir 108 causing a change in the sound velocity as measured by the acoustic sensor 132. If it is determined that a section of the silica gel 130 is leaking, the alkali metal silicate solution 124 can be distributed over the leaking section and contacted with carbon dioxide to form a silica gel to mitigate the leak.

In some embodiments, the wellbore wall 138 may include perforations 140 that allow a temperature sensor 134 to detect a change in temperature that is indicative of the integrity of the silica gel 130 or a leak. The temperature sensor 134 is configured to measure the temperature of the fluid 114 in the reservoir 108, which is in contact with the silica gel 130. This temperature measurement can be used to detect changes in the thermal properties of the fluid 114 or the silica gel 130, which can be indicative of a leak or deterioration of the silica gel 130. A change in temperature can indicate a leak or deterioration of the silica gel 130 in several ways. For example, if there is a leak in the silica gel 130, the temperature of the fluid 114 in the reservoir 108 may change due to the influx of cooler or warmer fluids from outside the reservoir 108. For example, if the leak allows cooler water to enter the reservoir, the temperature of the fluid 114 may decrease. Conversely, if the leak allows warmer fluids to enter, the temperature may increase.

In another example, the silica gel 130 can act as an insulator, reducing heat transfer between the fluid 114 in the reservoir 108 and the surrounding rock. If the silica gel 130 deteriorates or is breached, the heat transfer rate may increase, causing a change in the temperature of the fluid 114. In another example, if the silica gel 130 is exposed to carbon dioxide (CO2) from the reservoir 108, it may react with the CO2 to form a new compound, releasing heat in the process. This exothermic reaction can cause a localized increase in temperature, which can be detected by the temperature sensor 134. In another example, if there is a leak in the silica gel, the flow of fluid through the leak can cause a change in temperature due to the movement of fluid. For example, if the leak allows fluid to flow out of the reservoir, the temperature of the remaining fluid may increase due to the reduction in volume.

The temperature sensor 134 can be configured to measure the temperature of the fluid 114 in the reservoir at regular intervals. By monitoring the temperature over time, the temperature sensor 134 can detect changes in the temperature that may indicate a leak or deterioration of the silica gel 130. For example, if the temperature sensor 134 detects a sudden decrease in temperature, it may indicate that cooler water is entering the reservoir through a leak. Conversely, if the temperature sensor detects an increase in temperature, it may indicate that the silica gel is reacting with CO2 or that there is an increase in heat transfer due to a breach in the silica gel 130. By using the temperature sensor 134 in conjunction with the acoustic sensor 132, the system 100 can provide a more comprehensive monitoring solution for detecting leaks and deterioration of the silica gel 130.

Figure 2:
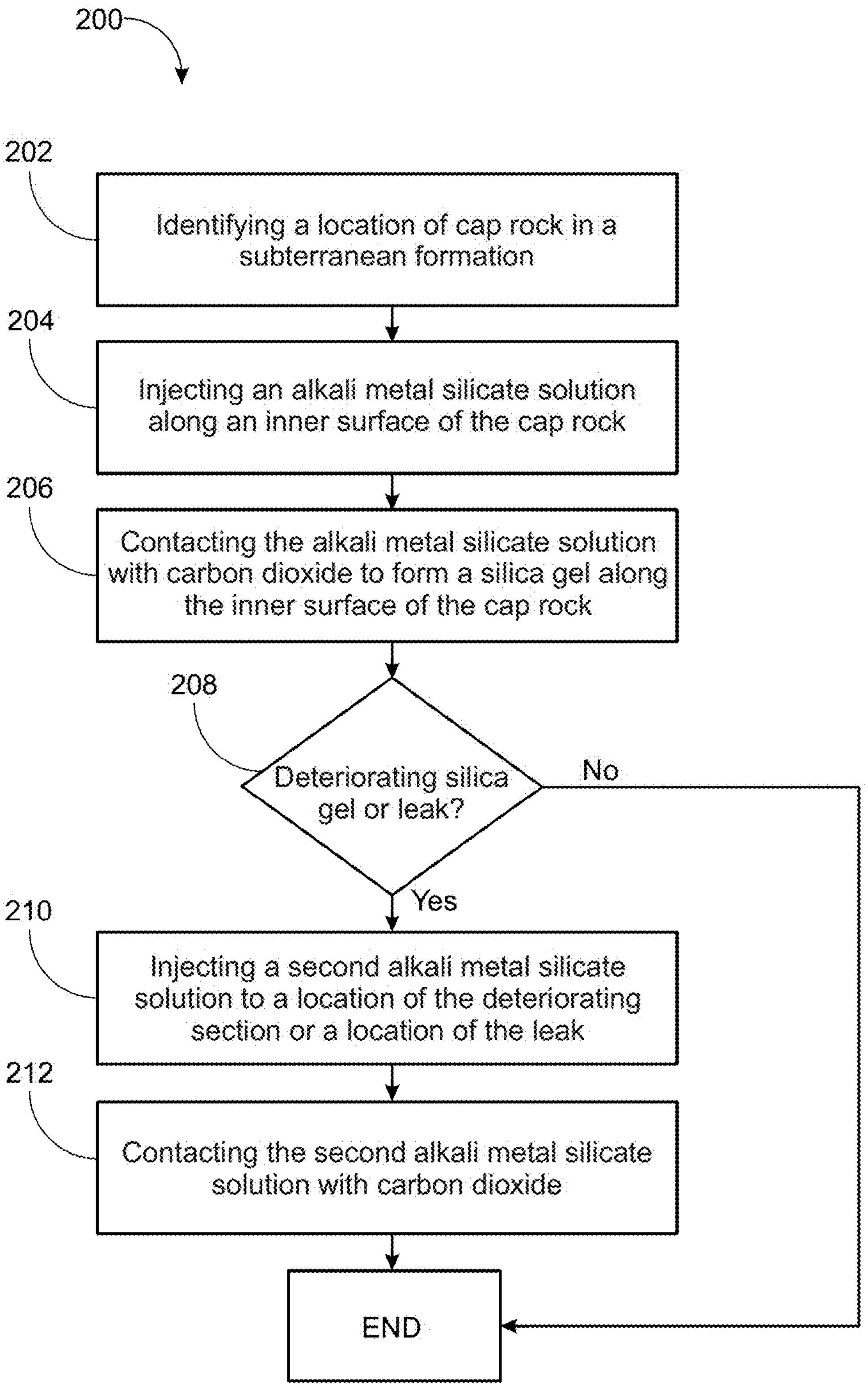
FIG. 2 is a method of sequestering carbon dioxide in a reservoir within a subterranean formation according to embodiments of the present disclosure.

Referring to FIG. 2, a method 200 for sequestering carbon dioxide 128 in a reservoir 108 is provided according to an embodiment of the present disclosure. At operation 202, the method 200 includes identifying a location of cap rock 110 in a subterranean formation 106. In some embodiments, operation 202 includes identifying the location of the cap rock 110 by conducting a seismic survey with a seismic device and detectors. The seismic device (e.g., vibrators, air guns, explosives) may generate seismic energy used to perform reflection and refraction seismic surveys. A detector (e.g., geophone or hydrophone) may record seismic signals. The seismic signals may be processed to identify subsurface geological structures, layers, and other features such as the location of the cap rock 110. In some embodiments, operation 202 includes identifying the location of the cap rock 110 using logging tools. For example, the logging tools may acquire data associated with lithology, porosity or fluid saturation of geological layers adjacent the wellbore 102. For example, the lithology data can be acquired using gamma ray logging, resistivity logging, density logging to identify a rock type, such as cap rock 110. Porosity and fluid saturation data can be acquired using neutron logging or acoustic logging to identify a rock type. In some embodiments, wireline imaging can be used to identify the cap rock 110, such as formation microimager (FMI) or wireline stress testing. In some embodiments, operation 202 includes generating the first set of perforations **116*a* in the wellbore 102. The first set of perforations 116*a* may be configured proximate the inner surface 118 of the cap rock 110. In some embodiments, the first set of perforations 116*a* are arranged, or otherwise orientated, to distribute the alkali metal silicate solution 124 along the inner surface 118 of the cap rock 110**.

At operation 204, the method 200 includes injecting the alkali metal silicate solution 124 through the wellbore 102 in the subterranean formation 106 such that the alkali metal silicate solution 124 distributes along the inner surface 118 of the cap rock 110. For example, a pump may be used to transport the alkali metal silicate solution 124 from the alkali metal silicate source 122 through production tubing in the wellbore 102 to the first set of perforations **116*a* such that the alkali metal silicate solution 124 distributes along an inner surface 118 of the cap rock 110. In some embodiments, prior to injecting the alkali metal silicate solution 124, operation 204 may include injecting a slug of water through the wellbore 102 in the subterranean formation 106 such that the slug of water distributes along the inner surface 118 of the cap rock 110**. The slug of water may be helpful to reduce impurities present and improve gelation.

At operation 206, the method 200 includes contacting the alkali metal silicate solution 124 with carbon dioxide 128 to form a silica gel 130 along the inner surface 118 of the cap rock 110. The carbon dioxide 128 can be delivered to the reservoir 108 after injecting the alkali metal silicate solution 124, before injecting the alkali metal silicate solution 124, or the carbon dioxide 128 may co-injected with the alkali metal silicate solution 124. In some embodiments, the carbon dioxide 128 is delivered to the reservoir 108 by injecting the carbon dioxide 128 from the carbon dioxide source 126 through the production tubing of the wellbore 102 to a second set of perforations 116*b* in the wellbore 102. The carbon dioxide 128 may be injected as supercritical carbon dioxide using a pump or compressor. The carbon dioxide 128 may create a plume that rises in the reservoir 108 to contact the alkali metal silicate solution 124 to form the silica gel 130. The silica gel 130 may extend along a sufficient distance along the inner surface 118 of the cap rock 110 to form a seal that mitigates the carbon dioxide from leaking out of the reservoir 108 through the cap rock 110. The silica gel 130 may be directed coupled to the inner surface 118 of the cap rock 110. In some embodiments, the silica gel 130 extends a distance along the inner surface 118 that is greater than a width of the plume of carbon dioxide 128 injected within the reservoir 108 such that the silica gel 130 acts as a seal, or otherwise barrier, that is positioned between the cap rock 110 and the plume of carbon dioxide 128. In some embodiments, the silica gel 130 extends along the entire inner surface 118 of the cap rock 110 in the reservoir 108.

At decision block 210, the method 200 includes determining if an integrity of the silica gel 130 is deteriorating or if a leak is present in the cap rock 108. In some embodiments, decision block 208 may include detecting, using an acoustic sensor 132, a change in sound velocity indicative of an integrity of the silica gel 130 or a leak. The acoustic sensor 132 may measure the sound velocity through the observation wellbore 136. For example, if the integrity of the cap rock 110 and the silica gel 130 deteriorate over time, the carbon dioxide 128 sequestered may leak out the reservoir 108. The leak may cause a change in the sound velocity as measured by the acoustic sensor 132. For example, the flow of carbon dioxide exiting the reservoir may cause a change in the sound velocity. In another example, as the carbon dioxide 128 leaks from the reservoir 108 it may be displaced by water in the reservoir 108 causing a change in the sound velocity as measured by the acoustic sensor 132. In some embodiments, decision block 208 may include detecting, using a temperature sensor 134, a change in temperature that is indicative of the integrity of the silica gel 130 or a leak, as described above.

If it is determined that silica gel 130 is deteriorating or if a leak is present, the method 200 may proceed to operation 210. At operation 210, the method includes injecting a second alkali metal silicate solution 124 through the wellbore 102 in the subterranean formation such that the second alkali metal silicate solution 124 distributes along the silica gel 130 in a location with the deteriorating section or a location of the leak. At operation 212, the method includes contacting the second metal silicate solution 124 with carbon dioxide 128 to strength the deteriorating integrity of the silica gel 130 or to mitigate, or otherwise stop, the leak.

EXAMPLES

Figure 3:
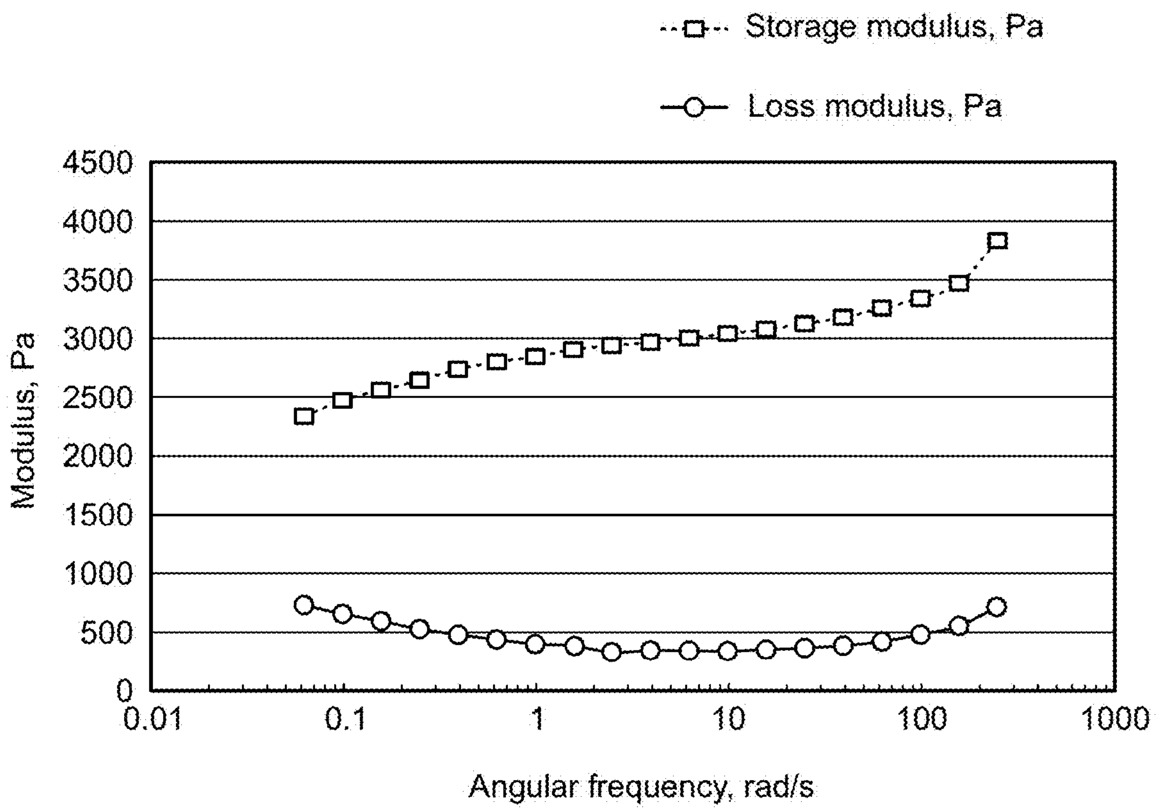
FIG. 3 is an image of storage modulus and loss modulus of silica gel against angular frequency.

A 5% sodium silicate solution was prepared by combining 0.5 mL of sodium silicate reagent with 9.5 mL of tap water. This mixture was then subjected to a stream of carbon dioxide gas for a duration of 3-5 minutes, during which the CO2 was bubbled through the solution. Upon cessation of the bubbling process, the transformation into a gelatinous state occurred rapidly, typically within the subsequent minute. Rheological testing of the 5% silica gel was performed using a TA rheometer from Waters Instrument Co., with the test conducted at a controlled temperature of 25° C. The results, as depicted in FIG. 3, illustrate the storage modulus and loss modulus of the silica gel against angular frequency.

Exemplary Embodiments

An embodiment of the present disclosure provides a method. The method includes identifying a location of cap rock in a subterranean formation, wherein the cap rock is positioned above a reservoir in the subterranean formation. The method includes injecting an alkali metal silicate solution through a wellbore in the subterranean formation such that the alkali metal silicate solution distributes along an inner surface of the cap rock. The method includes contacting the alkali metal silicate solution with carbon dioxide to form a silica gel along the inner surface of the cap rock.

In an embodiment, combinable with any other embodiment, the silica gel forms a seal along the inner surface of the cap rock that mitigates the carbon dioxide from leaking out of the reservoir through the cap rock.

In an embodiment, combinable with any other embodiment, the reservoir in the subterranean formation is a deep saline aquifer or a depleted oil reservoir.

In an embodiment, combinable with any other embodiment, an alkali metal silicate is present in the alkali metal silicate solution in an amount from 1 to 20 wt. %, based on a total weight of the alkali metal silicate solution.

In an embodiment, combinable with any other embodiment, an alkali metal in the alkali metal silicate solution is selected from the group consisting of sodium, potassium, lithium, rubidium, cesium, and combinations thereof.

In an embodiment, combinable with any other embodiment, the alkali metal silicate solution further includes an alkali salt in an amount from 0.5 to 12 wt. %, based on a total weight of the alkali metal silicate solution.

In an embodiment, combinable with any other embodiment, the alkali salt is selected from the group consisting of sodium hydroxide, sodium carbonate, and combinations thereof.

In an embodiment, combinable with any other embodiment, the alkali metal silicate solution comprises a polymeric additive in an amount from 1 to 15 wt. %, based on a total weight of the alkali metal silicate solution.

In an embodiment, combinable with any other embodiment, the polymeric additive is selected from the group consisting of polyacrylamide, polyacrylic acid, and combinations thereof.

In an embodiment, combinable with any other embodiment, the alkali metal silicate solution comprises a natural polymer additive in an amount from 0.5 to 10 wt. %, based on a total weight of the alkali metal silicate solution.

In an embodiment, combinable with any other embodiment, the natural polymer additive is selected from the group consisting of guar gum, cellulose, and combinations thereof.

In an embodiment, combinable with any other embodiment, the alkali metal silicate solution comprises an inorganic additive in an amount from 1 to 20 wt. %, based on a total weight of the alkali metal silicate solution.

In an embodiment, combinable with any other embodiment, the inorganic additive includes clay, a fiber material, or combinations thereof.

In an embodiment, combinable with any other embodiment, prior to injecting the alkali metal silicate solution, the method further includes injecting a slug of water through the wellbore in the subterranean formation such that the slug of water distributes along the inner surface of the cap rock to reduce impurities.

In an embodiment, combinable with any other embodiment, after injecting the alkali metal silicate solution, the method includes injecting the carbon dioxide into the reservoir.

In an embodiment, combinable with any other embodiment, before injecting the alkali metal silicate solution, the method includes injecting the carbon dioxide into the reservoir.

In an embodiment, combinable with any other embodiment, injecting the alkali metal silicate solution includes co-injecting the carbon dioxide into the reservoir.

In an embodiment, combinable with any other embodiment, the method includes detecting, using an acoustic sensor, a change in sound velocity indicative of an integrity of the silica gel or a leak. The method includes injecting a second alkali metal silicate solution through the wellbore in the subterranean formation such that the second alkali metal silicate solution distributes along the silica gel and contacting the second metal silicate solution with the carbon dioxide to strengthen the deteriorating integrity of the silica gel or mitigate the leak.

In an embodiment, combinable with any other embodiment, the method includes detecting, using a distributed temperature sensing system, a temperature gradient indicative of a deteriorating integrity of the silica gel or a leak. The method includes injecting a second alkali metal silicate solution through the wellbore in the subterranean formation such that the second alkali metal silicate solution distributes along the silica gel and contacting the second metal silicate solution with the carbon dioxide in the presence of the water to strengthen the deteriorating integrity of the silica gel or mitigate the leak.

An embodiment described herein provides a carbon dioxide sequestration system. The carbon dioxide sequestration system includes a caprock positioned above a reservoir in a subterranean formation, a silica gel positioned along an inner surface of the caprock, and carbon dioxide sequestered within the reservoir. The silica gel forms a seal along the inner surface of the caprock to mitigate the carbon dioxide from leaking out of the reservoir through the caprock.

In an embodiment, combinable with any other embodiment, the reservoir in the subterranean formation is a deep saline aquifer or a depleted oil reservoir.

In an embodiment, combinable with any other embodiment, the silica gel comprises an alkali metal selected from the group consisting of sodium, potassium, lithium, rubidium, cesium, or combinations thereof.

In an embodiment, combinable with any other embodiment, the silica gel comprises silicic acid and an alkali metal carbonate.

In an embodiment, combinable with any other embodiment, the silica gel comprises an alkali salt selected from the group consisting of sodium hydroxide, sodium carbonate, and a combination thereof.

In an embodiment, combinable with any other embodiment, the silica gel comprises a polymeric additive selected from the group consisting of polyacrylamide, polyacrylic acid, and a combination thereof.

In an embodiment, combinable with any other embodiment, the silica gel comprises a natural polymer additive selected from the group consisting of guar gum, cellulose, and combinations thereof.

In an embodiment, combinable with any other embodiment, wherein the silica gel comprises clay, a fiber material, or a combination thereof.

In an embodiment, combinable with any other embodiment, the silica gel has a storage modulus from 2000 Pa to 4000 Pa.

In an embodiment, combinable with any other embodiment, the silica gel has a loss modulus from 150 Pa to 500 Pa.

What is claimed is:

1. A method comprising:

identifying a location of a cap rock in a subterranean formation, wherein the cap rock is positioned above a reservoir in the subterranean formation;

injecting an alkali metal silicate solution through a wellbore in the subterranean formation to distribute the alkali metal silicate solution along an inner surface of the cap rock;

contacting the alkali metal silicate solution with carbon dioxide to form a silica gel along the inner surface of the cap rock, wherein the silica gel extends a distance along the inner surface that is greater than a width of a plume of carbon dioxide in the reservoir, and wherein the silica gel forms a seal along the inner surface of the cap rock that mitigates the carbon dioxide from leaking out of the reservoir through the cap rock.

2. The method of claim 1, wherein the reservoir in the subterranean formation is a deep saline aquifer or a depleted oil reservoir.

3. The method of claim 1, wherein an alkali metal silicate is present in the alkali metal silicate solution in an amount from 1 to 20 wt. %, based on a total weight of the alkali metal silicate solution.

4. The method of claim 1, wherein an alkali metal in the alkali metal silicate solution is selected from the group consisting of sodium, potassium, lithium, rubidium, cesium, and combinations thereof.

5. The method of claim 1, wherein the alkali metal silicate solution further comprises an alkali salt in an amount from 0.5 to 12 wt. %, based on a total weight of the alkali metal silicate solution.

6. The method of claim 5, wherein the alkali salt is selected from the group consisting of sodium hydroxide, sodium carbonate, and combinations thereof.

7. The method of claim 1, wherein the alkali metal silicate solution comprises a polymeric additive in an amount from 1 to 15 wt. %, based on a total weight of the alkali metal silicate solution.

8. The method of claim 7, wherein the polymeric additive is selected from the group consisting of polyacrylamide, polyacrylic acid, and combinations thereof.

9. The method of claim 1, wherein the alkali metal silicate solution comprises a natural polymer additive in an amount from 0.5 to 10 wt. %, based on a total weight of the alkali metal silicate solution.

10. The method of claim 9, wherein the natural polymer additive is selected from the group consisting of guar gum, cellulose, and combinations thereof.

11. The method of claim 1, wherein the alkali metal silicate solution comprises an inorganic additive in an amount from 1 to 20 wt. %, based on a total weight of the alkali metal silicate solution.

12. The method of claim 11, wherein the inorganic additive comprises clay, a fiber material, or a combination thereof.

13. The method of claim 1, wherein prior to injecting the alkali metal silicate solution, the method further comprises:

injecting a slug of water through the wellbore in the subterranean formation to distribute the slug of water along the inner surface of the cap rock to reduce impurities.

14. The method of claim 1, wherein after injecting the alkali metal silicate solution, the method comprises:

injecting the carbon dioxide into the reservoir.

15. The method of claim 1, wherein before injecting the alkali metal silicate solution, the method comprises:

injecting the carbon dioxide into the reservoir.

16. The method of claim 1, wherein injecting the alkali metal silicate solution includes co-injecting the carbon dioxide into the reservoir.

17. The method of claim 1, wherein the method comprises:

detecting, using an acoustic sensor, a change in sound velocity indicative of an integrity of the silica gel or a leak; and injecting a second alkali metal silicate solution through the wellbore in the subterranean formation to distribute the second alkali metal silicate solution along the silica gel; and contacting the second metal silicate solution with the carbon dioxide to strengthen the deteriorating integrity of the silica gel or mitigate the leak.

18. The method of claim 1, wherein the method comprises:

detecting, using a distributed temperature sensing system, a temperature gradient indicative of a deteriorating integrity of the silica gel or a leak; and injecting a second alkali metal silicate solution through the wellbore in the subterranean formation to distribute the second alkali metal silicate solution along the silica gel; and contacting the second metal silicate solution with the carbon dioxide in the presence of the water to strengthen a deteriorating integrity of the silica gel or mitigate the leak.

* * * * *